(12) United States Patent
Liepold et al.

(10) Patent No.: US 8,836,789 B2
(45) Date of Patent: Sep. 16, 2014

(54) CAMERA ARRANGEMENT FOR A VEHICLE AND METHOD FOR INSTALLING A CAMERA ARRANGEMENT IN A VEHICLE

(75) Inventors: Thomas Liepold, Galmersheim (DE); Günther Böhm, Walting (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/822,551

(22) PCT Filed: Aug. 10, 2011

(86) PCT No.: PCT/EP2011/003987
§ 371 (c)(1),
(2), (4) Date: Mar. 26, 2013

(87) PCT Pub. No.: WO2012/034621
PCT Pub. Date: Mar. 22, 2012

(65) Prior Publication Data
US 2013/0182112 A1 Jul. 18, 2013

(30) Foreign Application Priority Data
Sep. 13, 2010 (DE) .......................... 10 2010 045 214

(51) Int. Cl.
*H04N 7/18* (2006.01)
*B60R 11/04* (2006.01)
*H04N 5/225* (2006.01)
*B60R 11/00* (2006.01)

(52) U.S. Cl.
CPC .............. *H04N 5/2251* (2013.01); *B60R 11/04* (2013.01); *B60R 2011/0085* (2013.01)
USPC ......................................................... 348/148

(58) Field of Classification Search
USPC .......................................................... 348/148
See application file for complete search history.

(56) References Cited

U.S. PATENT DOCUMENTS

| 5,096,287 | A  | * | 3/1992 | Kakinami et al. ............ 352/132 |
| 5,729,016 | A  | * | 3/1998 | Klapper et al. ............... 250/334 |
| 6,593,565 | B2 | * | 7/2003 | Heslin et al. .................. 250/239 |
| 6,819,231 | B2 | * | 11/2004 | Berberich et al. ........... 340/435 |
| 7,893,958 | B1 | * | 2/2011 | D'Agostino .................. 348/148 |
| 8,118,501 | B2 | * | 2/2012 | Buschmann ................. 396/448 |
| 2003/0214733 | A1 | * | 11/2003 | Fujikawa et al. ............. 359/838 |
| 2006/0171704 | A1 | * | 8/2006 | Bingle et al. ................. 396/419 |

(Continued)

FOREIGN PATENT DOCUMENTS

| DE | 102 04 764 | 8/2003 |
| DE | 103 51 363 | 6/2005 |

(Continued)

OTHER PUBLICATIONS

International Search Report issued by the European Patent Office in International Application PCT/EP2011/003987.

*Primary Examiner* — Sath V Perungavoor
*Assistant Examiner* — Peter D Le
(74) *Attorney, Agent, or Firm* — Henry M. Feiereisen LLC

(57) ABSTRACT

A camera arrangement for a vehicle, with a camera unit constructed to be pivoted between an active position and an inactive position, and a chamber accommodating the camera unit, wherein in the inactive position a sealing cover that seals the chamber is arranged on the camera unit, with the camera unit being inaccessible from outside, and wherein in the active position the camera unit is pivoted out of the chamber for optically capturing a surrounding area and the camera unit seals the chamber. A method for installing the camera arrangement in a vehicle is also disclosed.

9 Claims, 3 Drawing Sheets

(56) References Cited

U.S. PATENT DOCUMENTS

| | | | |
|---|---|---|---|
| 2006/0256459 A1* | 11/2006 | Izabel et al. | 359/872 |
| 2007/0132610 A1* | 6/2007 | Guernalec et al. | 340/932.2 |
| 2009/0046149 A1* | 2/2009 | Ohsumi et al. | 348/148 |
| 2009/0085755 A1* | 4/2009 | Schafer et al. | 340/602 |
| 2009/0122141 A1* | 5/2009 | Nakamura et al. | 348/148 |
| 2009/0128629 A1* | 5/2009 | Egbert et al. | 348/148 |
| 2009/0135253 A1* | 5/2009 | Augst | 348/148 |
| 2009/0309971 A1* | 12/2009 | Schuetz | 348/148 |
| 2012/0007984 A1* | 1/2012 | Schutz | 348/148 |
| 2012/0026616 A1* | 2/2012 | Rawlings | 359/876 |

FOREIGN PATENT DOCUMENTS

| | | |
|---|---|---|
| DE | 202005017430 | 10/2006 |
| DE | 102005027750 | 12/2006 |
| DE | 602004003255 | 5/2007 |
| DE | 102006039192 | 2/2008 |
| DE | 102007052402 | 5/2009 |
| DE | 102008010966 | 8/2009 |
| DE | 102009056200 | 7/2010 |
| DE | 102009008281 | 8/2010 |
| DE | 102009008283 | 8/2010 |
| DE | 102010008214 | 9/2010 |
| EP | 1 332 923 | 8/2003 |
| EP | 1 648 737 | 11/2006 |
| JP | 4-24137 | 1/1992 |
| JP | 2001-58543 | 3/2001 |
| KR | 10-0729344 | 6/2007 |

* cited by examiner

CAMERA ARRANGEMENT FOR A VEHICLE AND METHOD FOR INSTALLING A CAMERA ARRANGEMENT IN A VEHICLE

CROSS-REFERENCES TO RELATED APPLICATIONS

This application is the U.S. National Stage of International Application No. PCT/EP2011/003987, filed Aug. 10, 2011, which designated the United States and has been published as International Publication No. WO 2012/034621 A1 and which claims the priority of German Patent Application, Serial No. 10 2010 045 214.9, filed Sep. 13, 2010, pursuant to 35 U.S.C. 119(a)-(d).

BACKGROUND OF THE INVENTION

Camera arrangements of this type are integrated into the body of vehicles for letting the driver comfortably observe the vehicle surroundings, in particular the rear portion of the vehicle. This occurs preferably by a motion playback of the image captured from the camera on a monitor mounted in the interior of the vehicle.

DE 10 2008 010 966 A1 discloses an arrangement for a vehicle with an unlocking device for unlocking a component of the vehicle, wherein the unlocking device includes a cover element that can be pivoted from a rest position into an open position. A camera configured to detect in an active position a surrounding area of the vehicle is arranged behind the cover element. The camera is movably supported in an open position of the cover element independently of the cover element between an inactive and the active position on a slide gate. Disadvantageously, the slide gate for moving the camera requires additional space. Furthermore, it is difficult and costly to seal the installation space when the cover element is open.

DE 10 2007 052 402 A9 describes a device with a camera unit used to capture images of the surrounding area of a motor vehicle, and a cover element which can be moved by a drive from a closed position into an open position. When the cover element is in the closed position, the camera unit is located behind the cover element and inaccessible from the outside. The camera unit is oriented in a recording direction wherein the image can be captured when the cover element is in the open position. The drive cooperates with a mechanism such that the cover element performs a two-phase movement when moving from the closed position to the open position. Disadvantageously, the mechanism for a two-phase movement of the cover can be complex and therefore expensive.

EP 1,648,737 B1 discloses a device providing rearview look for a motor vehicle, with a video camera designed for fixed integration in the rear of a motor vehicle, a lid movably disposed between a closed position and an open position, wherein the lid is arranged in front of and spaced from the lens of the video camera. Drive means are provided to displace the lid between the closed position and the open position, wherein the lid includes pivoting means defining a pivot axis and enabling movement from one position to the other position. The lid has a curved portion and articulated arms, wherein the articulated arms are fixedly connected to the curved portion and to the pivot means. Disadvantageously, the lid kinematics of this device is complex and delicate.

DE 103 51 363 A1 discloses a generic camera arrangement for motor vehicles with a camera unit for image capture, wherein the camera unit is in an inactive position arranged behind a pivotable protective element and thus essentially inaccessible from the outside. The camera unit is arranged on and pivotally connected to the protective element, wherein the protective element with the camera unit disposed thereon can be pivoted from a position covering the camera unit in which the camera unit in the inactive position, into a position in which the camera unit is in an active position for image capture. Disadvantageously, this type of camera arrangement has insufficient sealing properties in the active position, allowing moisture to enter the interior of the arrangement and cause corrosive damage.

SUMMARY OF THE INVENTION

It is therefore an object of the present invention to provide a compact and inexpensive camera arrangement for a vehicle, wherein the camera arrangement is protected from vandalism and the weather, and a method for installing such a camera assembly in a vehicle.

A camera arrangement for a vehicle with a camera unit for image capture, which can be pivoted into an active and an inactive position, wherein the camera unit is in the inactive position arranged in a chamber and inaccessible from the outside and is in the active position pivoted out of the chamber for optically detecting a surrounding area, wherein the camera unit seals the chamber in the active position, and wherein a sealing cover sealing the chamber in the inactive position is arranged on the camera unit.

Because the sealing cover on the camera unit closes the opening to the chamber in the inactive position and the camera unit closes the opening in the active position, neither particles nor moisture can enter the chamber in the two end positions of the camera unit and cause corrosion damage. In addition, the camera arrangement can attain a compact and advantageous design by attaching the sealing means on the camera unit. Pivoting the camera unit inherently causes the sealing means to contact the respective components. The sealing cover may be formed on or attached to the camera unit as an additional component. Electronic components necessary to use the camera unit and the drive needed to pivot the camera unit can also be arranged inside the chamber. The camera unit is unable to visually detect the surrounding area of the vehicle in the inactive position. The camera unit typically remains in the inactive position to protect the camera unit from vandalism. The camera unit is pivoted into the active position and image capture is activated only when the vehicle operator desires a visual display of the respective surrounding area of the vehicle, for example to facilitate maneuvering.

In a preferred embodiment, a rim is formed on the camera unit, which seals the chamber in the active position of the camera unit. In the active position of the camera unit, the rim contacts an edge portion of the chamber so as to protect against ingress of particles and moisture. The rim extends at least partially around the outer circumference of the camera unit and is preferably formed as a single piece with the camera unit.

In a preferred embodiment, an optical lens of the camera unit is arranged between the rim and the sealing cover. Rim and sealing cover are oriented at an angle with respect to one another, causing their imaginary extension planes to intersect. The angle between the two extension planes is preferably an acute angle, in a particularly preferred embodiment an angle of about 45°. The optical lens is enclosed between the planes of the rim and the sealing cover, so that the optical lens is located in the inactive position within the protective chamber, and in the active position outside the chamber.

In a preferred embodiment, the camera unit can be pivoted with a spindle drive. A spindle drive allows a particularly compact drive design. The spindle drive cooperates with a toothed portion formed on the camera unit in the form of a worm gear.

In a preferred embodiment, the pivot axis passes through the camera unit, which allows an even more compact design. Preferably, the pivot axis is parallel in close proximity to a plane spanned by the rim, or is part of such a plane.

In a preferred embodiment, the chamber is formed in a housing module. The housing module combines the components of the camera assembly into an easily manageable unit, thereby facilitating installation in a vehicle. The housing module may be assembled from several sub-modules. The camera unit, its drive and the electronic circuits may then be arranged in a camera module. Additional modules, such as an operating module having an operating device for unlocking a lid or door, may be added in modular form.

In a preferred embodiment, the housing module is attached to a lid or door of the vehicle. The lid or door is used to selectively close an access opening to the passenger compartment in the vehicle body. In particular, the lid refers to a tailgate, so the camera unit performs the function of a rear-view camera.

In a preferred embodiment, an operating device to operate the lid or door is included in the housing module. When the housing module additionally accommodates an operating means for unlocking a lid or door, both functions can be inexpensively and easily incorporated in the housing module. When a camera unit is not to be installed some situations, the chamber in the camera module can be closed by a blank cover on the operating module.

In a preferred embodiment, the sealing cap is positively secured to the camera unit. The positive connection between the sealing cap and the camera unit enables quick assembly.

A method for installing a camera arrangement in a vehicle includes the following steps:
  arranging a camera unit that can be pivoted between an active position and an inactive position for image capture in a camera module;
  arranging an operating device for operating a lid or door of the vehicle in an operating module;
  inserting the operating module into a body opening of the lid or door from the outside;
  arranging the camera module on the inside of the lid or door;
  combining the camera module and the operating module into a housing module;
  mounting a sealing cap on the camera unit.

The installation of a camera arrangement in a vehicle according to the aforedescribed method has the advantage that the valuable camera module is arranged inside the lid or door and protected from theft. The body opening is selected to be just large enough so that the camera module cannot be removed through the body opening from the outside. The camera module and the externally introduced operating module are preferably interconnected by clips, which can not be disengaged again without being destroyed. By attaching the sealing cover to the camera unit in a final step, the opening of the chamber, through which the camera unit is pivoted, can extend as closely as possible around the camera unit. This has a positive effect on the sealing properties of the sealing cap. The edge of the camera unit preferably seals in the active position against the operating module. The camera module may again be composed of two housing halves to facilitate installation of the camera unit, the actuator and the electronic components.

In a preferred embodiment, the camera unit is in the inactive position for connecting the camera module to the control module, and in the active position for attaching the sealing cover to the camera unit.

BRIEF DESCRIPTION OF THE DRAWING

Further details, features and advantages of the invention will become apparent from the following description of a preferred exemplary embodiment with reference to the drawings.

The drawings show in.

DETAILED DESCRIPTION OF PREFERRED EMBODIMENTS

Figure 1:
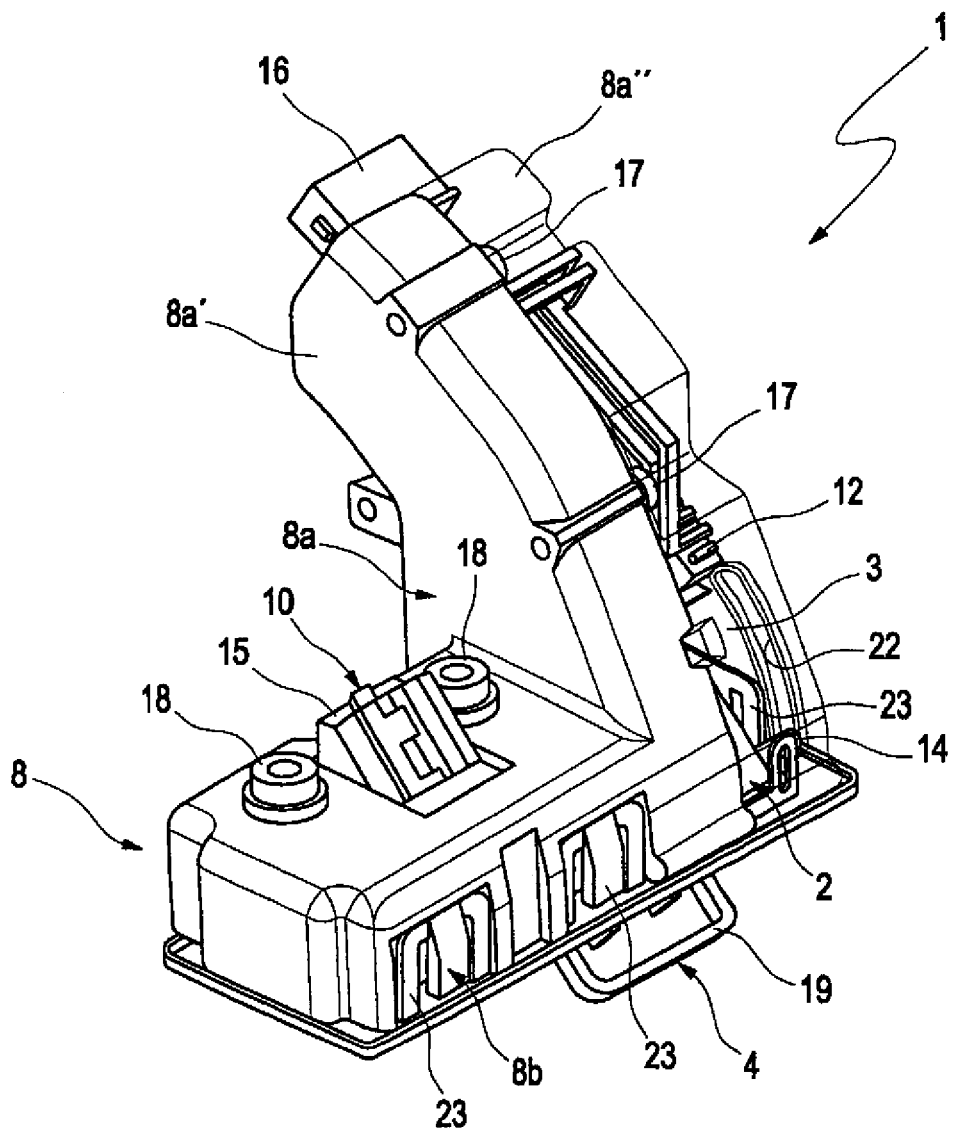
FIG. 1 a camera arrangement in the active position.
Figure 2:
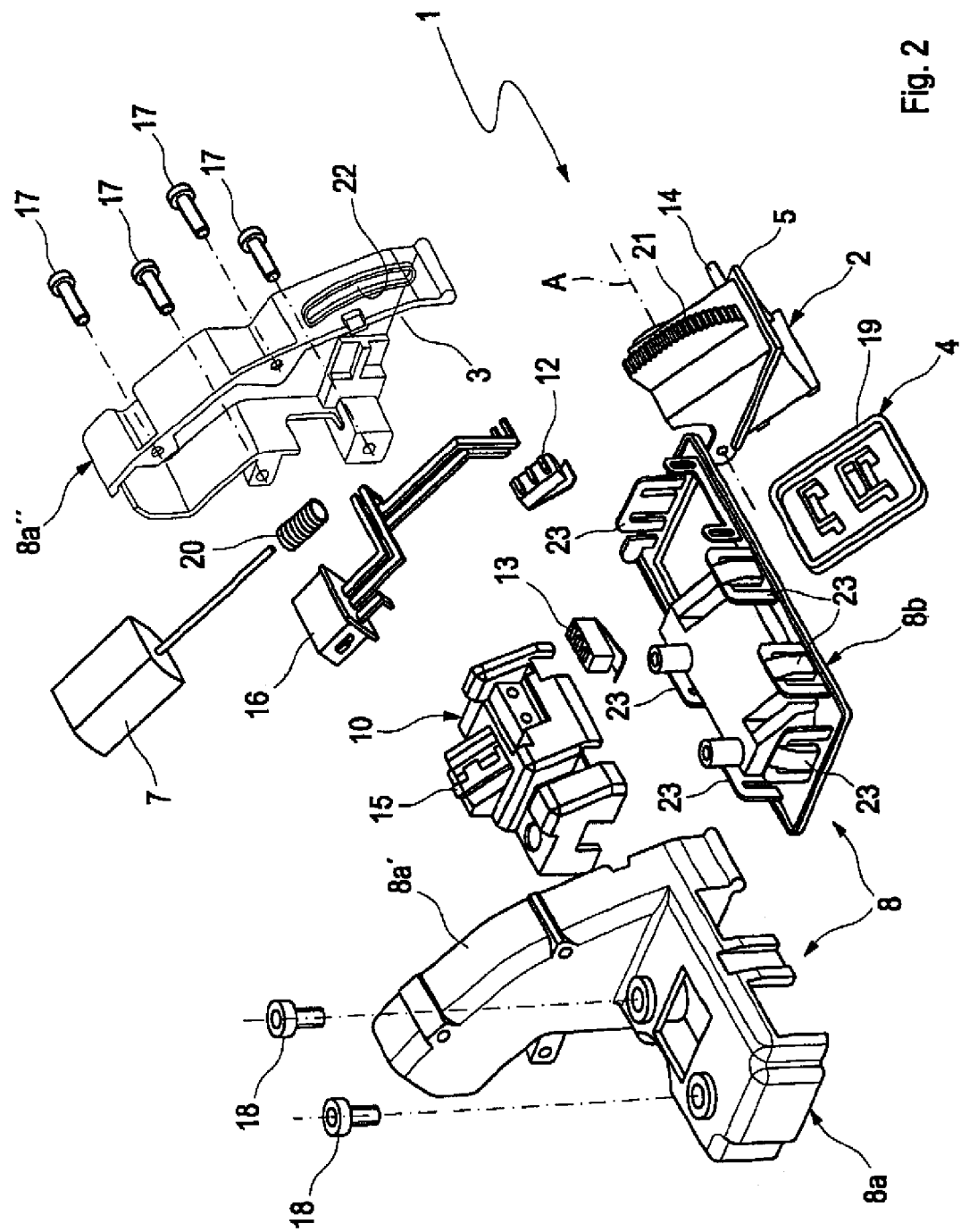
FIG. 2 an exploded view of a camera arrangement.

FIG. 1 shows an camera arrangement 1 according to the present invention in an active position, with FIG. 2 showing the same camera arrangement 1 in an exploded view. The housing module 8 is composed of a camera module 8*a* and an operating module 8*b*. The camera module 8*a* is in turn composed of two housing halves 8*a*' and 8*a*". An operating device 10 with an electrical connection 15 and an operating switch 13 is mounted on the actuation module 8*b*. The operating module 8*b* is at least partially made of a soft component, wherein the operating switch 13 is arranged in the region of this soft component. Operation of the operating switch 13 triggers unlocking of a door or lid of the vehicle. The camera unit 2 is installed in a chamber 3 of the camera module 8*a*. The camera unit 2 can be pivoted about a pivot axis A and is guided via a guide pin 14 in a slide gate 22 of the second housing half 8*a*". The camera unit 2 which has a substantially cubic shape has a diagonal edge 5, which extends over three of the four sides of the camera unit 2. No rim 5 is provided in region of the pivot axis A. A sealing cap 4 with a circumferential sealing lip 19 can be positively fastened on the underside of the camera unit 2. A toothed portion 21 is formed on the opposite top side of the camera unit 2, with the toothed portion 21 meshing with a spindle 20 of a spindle drive 7 that is also located in the chamber 3. A camera switch 12 configured to sense the active and inactive position of the camera unit 2 is arranged in the chamber 3. The electrical contact is made by the electrical connection 16, which extends out of the chamber 3 to the outside of the camera module 8*a*. After installation of the camera unit 2, the camera switch 12, the spindle drive 7 and the electrical connection 16, the first housing half 8*a*' and the second housing half 8*a*' are screwed to the camera module 8*a* with four screws 17. The operating module 8*b* and the camera module 8*a* are connected to the housing module 8 with clips 23 and bolts 18. In the active position, the rim 5 of the camera unit 2 sealingly abuts the control module 8*b*, whereas in the inactive position the sealing lip 19 of the sealing cap 4 sealingly abuts the operating module 8*b*.

Figure 3:
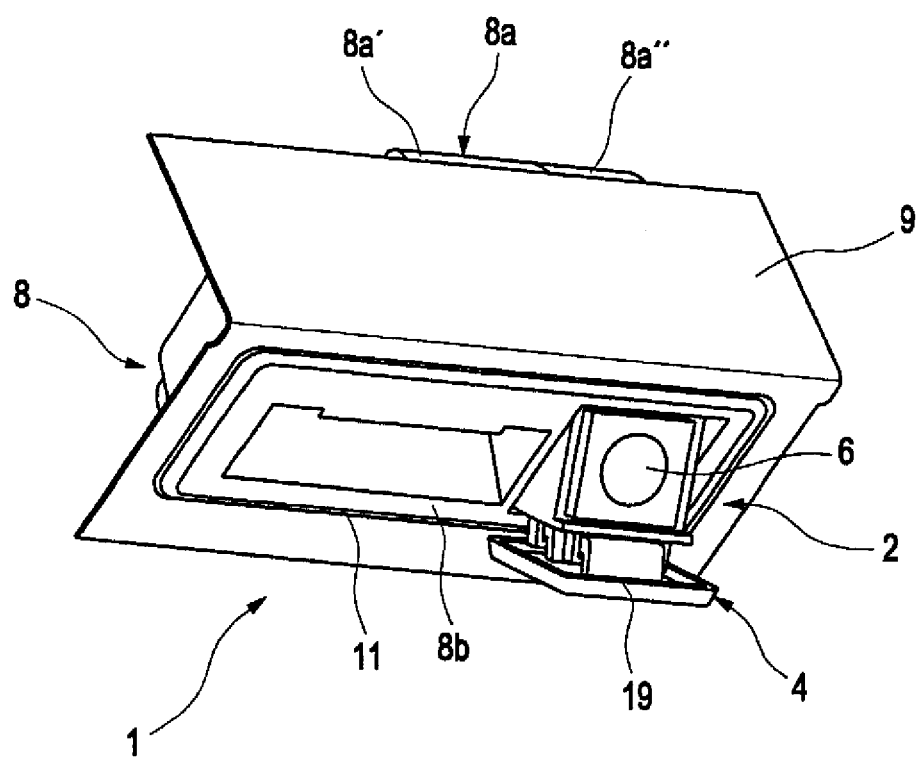
FIG. 3 a camera arrangement installed in a lid or door.

FIG. 3 shows a camera assembly 1 after installation in a lid or door 9 of a vehicle. To this end, the camera module 8*a* composed of the first housing half 8*a*' and the second housing half 8*a*" is brought into close proximity from inside the lid or door 9 and the operating module 8*b* is inserted from the outside through the body opening 11 into the lid or door 9. The camera module 8*a* and the operating module 8*b* are interconnected and can thus no longer be removed from the body opening 11 in either direction. The camera unit 2 is pivoted into the active position to attach the sealing cover 4. In the active position, the optical lens 6 can detect a surrounding area of the vehicle. The sealing lip 19 of the sealing cover 4 sealingly abuts the operating module 8b in the inactive position.

The invention claimed is:

1. A camera arrangement for a vehicle, comprising:
   a camera unit comprising a peripheral rim and constructed to be pivoted between an active position and an inactive position,
   a chamber accommodating the camera unit, wherein in the inactive position the camera unit is housed inside the chamber and a sealing cover which seals the chamber is disposed on the camera unit and wherein the camera unit is inaccessible from outside, and wherein in the active position the camera unit is pivoted out of the chamber for optically capturing a surrounding area, with the peripheral rim providing a seal between the camera unit and the chamber in the active position of the camera unit.

2. The camera arrangement of claim 1, wherein the camera unit comprises an optical lens disposed between the rim and the sealing cover.

3. The camera arrangement of claim 1, further comprising a spindle drive for pivoting the camera unit between the active position and the inactive position.

4. The camera arrangement of claim 3, wherein the camera unit is pivoted about a pivot axis extending through the camera unit.

5. The camera arrangement of claim 1, further comprising a housing module in which the chamber is formed.

6. The camera arrangement of claim 5, wherein the housing module is attached on a lid or a door of the vehicle.

7. The camera arrangement of claim 5, wherein the housing module is constructed to receive an operating device for operating the lid or door.

8. The camera arrangement of claim 1, wherein the sealing cover is positively attached on the camera unit.

9. A method for installing a camera arrangement in a vehicle, comprising the steps of:
   arranging in a camera module a camera unit that can be pivoted between an active and an inactive position for image capture;
   arranging in an operating module an operating device for operating a lid or a door of the vehicle;
   inserting the operating module from outside into a body opening of the lid or door;
   arranging the camera module on an inside the lid or door;
   connecting the camera module and the operating module to a housing module; and
   attaching a sealing cover on the camera unit,
   wherein in the inactive position the camera unit is housed inside the camera module and a sealing cover which seals the camera module is disposed on the camera unit and wherein the camera unit is inaccessible from outside, and wherein in the active position the camera unit is pivoted out of the camera module for optically capturing a surrounding area and the camera unit seals the camera module.

* * * * *